Patented Oct. 27, 1942

2,299,758

UNITED STATES PATENT OFFICE 2,299,758

SAPOGENIN DERIVATIVE AND PREPARATION OF THE SAME

Russell Earl Marker, State College, Pa., assignor to Parke, Davis & Company, Detroit, Mich., a corporation of Michigan No Drawing. Application August 3, 1940,
Serial No. 351,148

15 Claims. (Cl. 260—397.2)

This invention relates to sapogenin derivatives and preparation of the same, and more particularly to the preparation of new sapogenin derivatives having a reduced side chain.

One of the objects of this invention is to prepare new sapogenin derivatives which have a novel structure for the side chain.

Another object of this invention is the preparation of new sapogenin derivatives having a reduced side chain.

Other objects of this invention will be apparent from the perusal of this specification and the appended claims.

The steroidal sapogenins have, in general, the formula $C_{27}H_{42-4}O_{3-5}$, of which the portion $C_8H_{16}O_2$ is known to be present as a side chain attached to ring D of the steroid skeleton. Tschesche and Hagedorn (Ber. 68, 2247 (1935)) proposed the formula

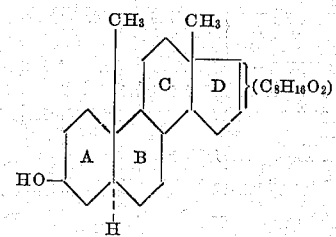

or

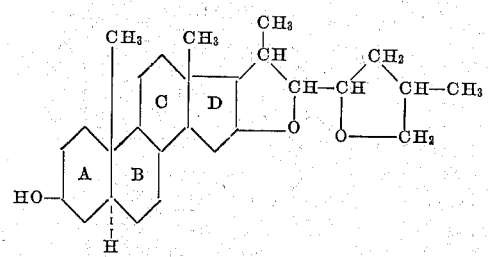

for the sapogenin, tigogenin, and later workers have, with reservations, accepted this formulation of the steroidal sapogenin side chain. Other sapogenins such as digitogenin, gitogenin, chlorogenin, diosgenin, and sarsasapogenin have been shown to differ from tigogenin only in regard to the connections between ring A and B, the degree of saturation of the ring system, and the number of substituents attached to these rings.

These differences are shown below:

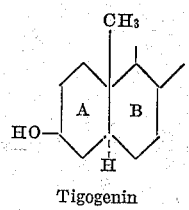
Tigogenin

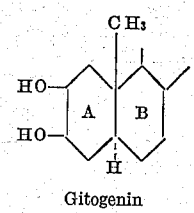
Gitogenin

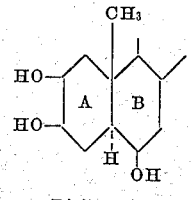
Digitogenin

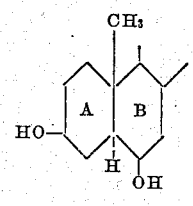
Chlorogenin

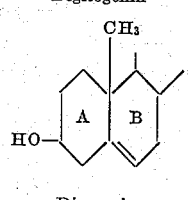
Diosgenin

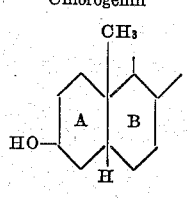
Sarsasapogenin

I have recently suggested (Marker & Rohrmann J. Am. Chem. Soc. 61, 846 (1939)) that a more likely structure for the side chain of these steroidal sapogenins is that shown below.

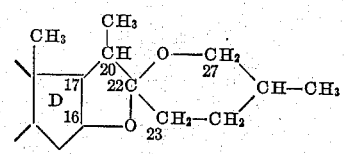

It is apparent that this formulation differs from that of Tschesche and Hagedorn in that the linkage, $C_{27}$—O—, is transferred from $C_{23}$ to $C_{22}$. However, a profound difference in the nature of the functional character of the side chain oxygen atoms is implied, for while the Tschesche-Hagedorn formula is that of an α,α'-di-tetrahydrofuryl derivative, the Marker-Rohrmann formula is that of a spiro-ketal.

Recently it has been found (Marker & Rohrmann, J. Am. Chem. Soc. 61, 846, 1516, 2724, 3479, (1939); 62, 647, 896, 1162)) that the side chain of the naturally occurring sapogenins exists in two modifications. Sarsasapogenin contains one type of side chain characterized by the fact that a sapogenin of this type is readily reduced according to the Clemmensen procedure using alcoholic hydrochloric acid and amalgamated zinc (Marker & Rohrmann, J. Am. Chem. Soc. 61, 846 (1939)) to give tetrahydro derivatives, that is to say, new sapogenin derivatives in which the side chain has 4 more hydrogen atoms than in the sapogenins themselves. Tigogenin, gitogenin, digitogenin, chlorogenin and diosgenin behave differently from sarsasapogenin in that they are not reduced by the Clemmensen procedure, that is to say, they are recovered unchanged after boiling with alcoholic hydrochloric acid and amalgamated zinc. Isosarsasapogenin is converted under the conditions of the Clemmensen reduction to the same tetrahydrosarsasapogenin that sarsasapogenin itself yields. These facts, and others which are cited in the references listed, appear to me to be best explained by assuming that the two types of steroidal sapogenin side chains differ in regard to optical isomerism about $C_{22}$. Accordingly, when it is necessary to distinguish between isomers about $C_{22}$ I represent the two types of side chains by formulae of the following type:

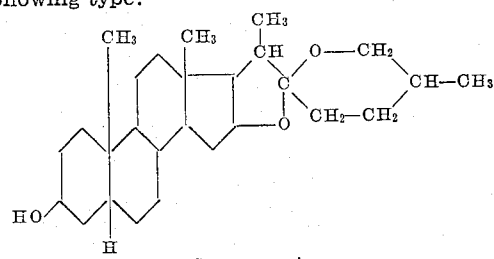

Sarsasapogenin
("Sarsasapogenin type" side chain)

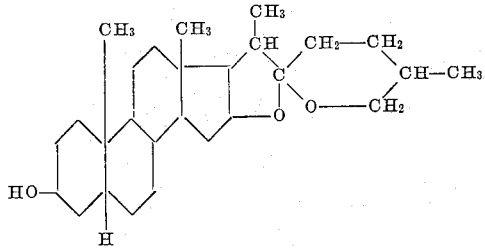

Isosarsasapogenin
("Tigogenin type" side chain)

See especially Marker & Rohrmann, J. Am. Chem. Soc. 62, 896 (1940). Ordinarily where isomerism about $C_{22}$ is not of importance, the formula for the sarsasapogenin type of side chain will be used for configurations both of sarsasapogenin and tigogenin type.

These two types of sapogenin side chains appear to be subject to an equilibrium, the velocity of attainment of which is catalyzed by acidic reagents. The equilibrium is influenced by the configuration of the hydrogen atom at $C_5$, and it appears that the following rule holds true. For compounds of the allo series (cholestane type) the tigogenin type of side chain is the more stable, while for compounds of the regular series (coprostane type) at $C_5$ the sarsasapogenin side chain is the more stable.

For the purpose of greater clarification, the Marker-Rohrmann formulation of the side chain of the steroidal sapogenins will be used in describing the invention. It is to be understood, however, that the processes and products of the present invention may be obtained by the use of the methods herein to be described and these processes and products are claimed without any implications that the reactions and structures involved will ultimately be proved to be as represented herein.

I have found that steroidal sapogenins having the regular or coprostane configuration at $C_5$ can be converted by treatment with mineral acid and zinc, under conditions more vigorous than those required merely to reduce a nuclear 3-keto group, to form new sapogenin derivatives with an altered side chain. The altered side chain of these new sapogenin derivatives differs from the side chain of the sapogenins themselves by the presence of four more hydrogen atoms. These new reduced sapogenin derivatives I call tetrahydrosapogenins. They show certain characteristic reactions which distinguish them from the sapogenins themselves. Thus:

(a) Whereas the sapogenins are readily halogenated in the side chain, for example, by treatment with bromine in acetic acid, the tetrahydrosapogenins show no tendency to halogenate in the side chain under comparable conditions;

(b) Whereas the sapogenins may be hydrogenated, under acidic conditions, in the side chain to give dihydrosapogenins, the tetrahydrosapogenins show no tendency to add hydrogen to the side chain;

(c) Whereas the sapogenins are readily oxidized by selenium dioxide with the formation of a red precipitate of metallic selenium (for example when the sapogenins are heated for awhile with selenium dioxide in a mixture of acetic acid and benzene), the tetrahydrosapogenins are unaffected by treatment with selenium dioxide under comparable conditions;

(d) Whereas in the side chain of the sapogenins both of the oxygen atoms appear to be insert to the ordinary reagents used to determine the presence of hydroxyl, carboxyl or ketone groups, the tetrahydrosapogenins contain in the side chain one rather inert oxygen atom and another oxygen atom present as a hydroxyl group—and apparently this hydroxyl group is a primary hydroxyl group—characterized by its ability to be esterified, etherified and replaced by halogen on treatment with reagents customarily used for this purpose.

The new tetrahydrosapogenin derivatives may, therefore, be represented by the following formula

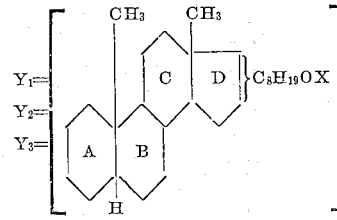

where $Y_1$, $Y_2$ and $Y_3$ are substituents attached to methylene carbon atoms in the A—B portion of the steroid skeleton, said substituents $Y_1$, $Y_2$ and $Y_3$ being members of the class consisting of

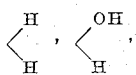

and groups convertible to

such as

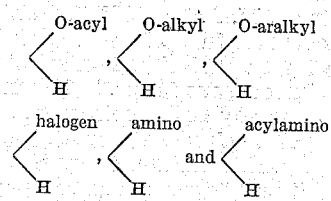

and X is a member of the class consisting of —OH and groups hydrolyzable to —OH such as —O-acyl, —O-aralkyl and halogen.

The term "methylene carbon atom" refers to a carbon atom having not more than two carbon atoms attached to it. The methylene carbon atoms in the A—B portion of the steroid skeleton are those carbon atoms numbered 1, 2, 3, 4, 6, and 7.

In view of the reactions, already set forth, of these new tetrahydrosapogenin derivatives I have proposed a tentative structure for compounds of this type (Marker & Rohrmann, J. Am. Chem. Soc., 61, 846 (1939)). This structure may be illustrated by the formula for tetrahydrosarsasapogenin which I believe to be as follows:

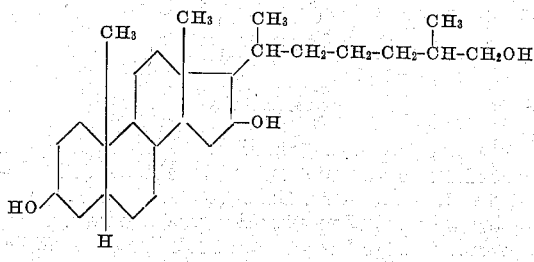

Tetrahydrosarsasapogenin

To prepare my new tetrahydrosapogenin derivatives I treat steroidal sapogenins with the combination of a mineral acid in an organic solvent and zinc. I find that for best results one must make a careful choice of the combination of mineral acid and organic solvent used. I find especially that the use of a homogeneous solution is desirable, for if two phases are present during the reduction the yields are considerably diminished. For best results I prefer to use amalgamated zinc and a solution containing from 1 to 5 parts of concentrated hydrochloric acid per 10 parts of organic solvent, and as organic solvents I prefer to use a lower aliphatic alcohol such as methanol, ethyl alcohol or one of the two isomeric propanols.

My invention may be further illustrated by the following examples:

*Example 1*

To a solution of 500 mg. of sarsasapogenin acetate in 100 cc. of 95% alcohol is added 20 g. of amalgamated zinc and the mixture is heated to boiling. Then 15 cc. of concentrated hydrochloric acid is added slowly to the boiling mixture over a period of four hours. At the end of this time the mixture is refluxed for an additional hour. Then the solution is poured into water and the suspension extracted with ether. The ethereal layer is separated, washed with sodium carbonate solution and with water and the ether evaporated on the steam bath. The residue is crystallized from ethyl acetate to give compact white crystals, melting point 193° C. This is tetrahydrosarsasapogenin, and it gives a 20° depression in melting point when mixed with sarsasapogenin itself.

Tetrahydrosarsasapogenin may be acetylated by refluxing with ten times its weight of acetic anhydride for a half hour. The acetic anhydride is removed in vacuo to leave the sirupy diacetate of tetrahydrosarsasapogenin. This diacetate resists crystallization but may be distilled without decomposition.

The dibenzoate of tetrahydrosarsasapogenin is a characteristic derivative. It may be prepared by treating a solution of 100 mg. of terahydrosarsasapogenin in 5 cc. of dry pyridine with 7 drops of benzoyl chloride. The mixture is allowed to stand at room temperature for eight hours and then it is heated on the steam bath for one hour. Then the solution is poured into water and the resulting mixture extracted with ether. The ethereal layer is separated, washed with dilute hydrochloric acid, dilute sodium carbonate solution, and finally with water. Then the ether is evaporated on the steam bath and the residue crystallized from aqueous acetone to give small white plates of melting point 149° C. This is the dizenzoate of tetrahydrosarsasapogenin.

*Example 2*

To a solution of 1 g. of sarsasapogenin in 200 cc. of 95% alcohol is added 40 g. of amalgamated zinc and the mixture is then heated to boiling. Then 30 cc. of concentrated hydrochloric acid is added slowly to the boiling mixture over a period of four hours. After refluxing the mixture for an additional hour, it is diluted with water, extracted with ether and the ethereal extract washed with sodium carbonate solution and with water. The ethereal extract is evaporated to dryness and the residue crystallized from ethyl acetate to give compact white crystals of tetrahydrosarsasapogenin, melting point 193° C. This is identical with the preparation described in Example 1, but the yield is even better.

Unamalgamated zinc may be substituted for amalgamated zinc in this example, but the yields obtained are not as satisfactory as those when amalgamated zinc is used. Likewise, hydrobromic acid may be substituted for hydrochloric acid, but as a rule this offers no advantage. When the reaction is carried out over a longer period of time crystalline products are more difficult to isolate. This indicates that tetrahydrosarsasapogenin is somewhat sensitive to acids.

The tetrahydrosarsasapogenin of this example may be sublimed without decomposition at 180° C. in a high vacuum.

*Example 3*

Satisfactory yields of tetrahydrosarsasapogenin and also of other tetrahydrosapogenins may be obtained by reducing the corresponding side chain brominated or side chain chlorinated sapogenin. This is illustrated by the preparation of tetrahydrosarsasapogenin from bromosarsasapogenin.

A solution of 500 mg. of bromosarsasapogenin acetate in 100 cc. of 95% alcohol is mixed with 20 grams of amalgamated zinc and the mixture heated to boiling. Then 15 cc. of concentrated hydrochloric acid is added slowly over a period of four hours while keeping the mixture at the boiling point. The mixture is refluxed an additional hour and then diluted with water. The resulting suspension is extracted with ether, the ethereal extract washed with sodium carbonate solution and with water and the ether removed on the steam bath. The residue is crystallized from ethyl acetate to give compact white crystals of tetrahydrosarsasapogenin of melting point 193° C.

*Example 4*

To a solution of 300 mg. of isosarsasapogenin (prepared for example as described by Marker and Rohrmann, J. Am. Chem. Soc., 61, 851 (1939)) in 75 cc. of alcohol is added 15 g. of amalgamated zinc. The mixture is brought to a boil and 12 cc. of concentrated hydrochloric acid is added slowly over a period of four hours. At the end of this time the mixture is diluted with water extracted with ether and the ethereal extract washed free of acid. The ether is removed on the steam bath and the residue crystallized from acetone to give compact white crystals of tetrahydrosarsasapogenin of melting point 193° C. This gives no depression in melting point when mixed with an authentic sample prepared by any of the methods given in the earlier examples.

*Example 5*

To a solution of 300 mg. of bromoisosarsasapogenin, (prepared, for example, as described by Marker and Rohrmann, J. Am. Chem. Soc., 61, 851 (1939)), in 75 cc. of alcohol is added 12 g. of amalgamated zinc. The mixture is brought to a boil and 12 cc. concentrated hydrochloric acid is added over a period of four hours. The mixture is refluxed an hour longer and then diluted with water, extracted with ether, and the ethereal extract worked up as described in previous examples. The residue, after removing the ether, is crystallized from ethyl acetate to give tetrahydrosarsasapogenin of melting point 193° C.

*Example 6*

(a) Desoxysarsasapogenin, melting point 214-215° C. is prepared, for example, as described by Marker and Rohrmann, J. Am. Chem. Soc., 61, 1284 (1939).

(b) To a mixture of 150 mg. of desoxysarsasapogenin and 20 g. of amalgamated zinc in 50 cc. of boiling 95% alcohol is added 10 cc. of concentrated hydrochloric acid over a period of nine hours. Then the solution is poured into water and the mixture extracted with ether. The ethereal extract is washed with water and the ether evaporated on the steam bath. The sirupy residue is crystallized from ether-hexane to give silky white needles, melting point 101° C. of tetrahydrodesoxysarsasapogenin. This depresses the melting point of dihydrodesoxysarsasapogenin, M. P. 109–110° C. showing that the two substances are not identical.

Instead of using alcohol in this example, other organic solvents such as methanol, isopropyl alcohol, n-propyl alcohol and dioxane may be used with as satisfactory results.

*Example 7*

To a solution of 500 mg. of sarsasapogenone in 100 cc. of 95% alcohol is added 50 g. of amalgamated zinc. The mixture is brought to a boil and 30 cc. of concentrated hydrochloric acid is added over a period of six hours. At the end of this time the mixture is diluted with water, extracted with ether and the ethereal layer washed with water. After removal of the ether the residue is crystallized from ether-hexane to give tetrahydrodesoxysarsasapogenin as white needles of melting point 100° C.

The mother liquors from the above crystallization of tetrahydrodesoxysarsasapogenin yield a substance, M. P. 118° C. which likewise appears to be tetrahydrodesoxysarsasapogenin. For the two substances, M. P. 100–101° C. and M. P. 118° C., do not depress in M. P. and show the same carbon, hydrogen analytical figures. Apparently they are polymorphous forms, although it is possible that they may be stereoisomers.

When tetrahydrodesoxysarsasapogenin is treated with an etherifying agent, the monoether of tetrahydrodesoxysarsasapogenin is formed. Thus, a mixture of 1 g. of tetrahydrodesoxysarsasapogenin, 1 g. of triphenylmethyl chloride, and 15 cc. of dry pyridine is allowed to stand at room temperature for five days. Then the mixture is poured into ice water, and the gummy solid collected. It is recrystallized from acetone to give the triphenylmethyl ether of tetrahydrodesoxysarsasapogenin as white crystals. This substance may be represented by the formula

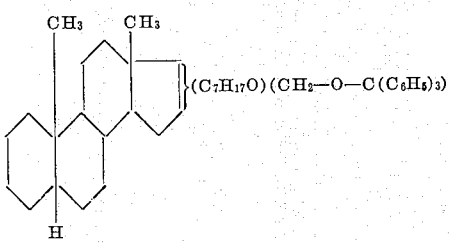

*Example 8*

(a) Bromosarsasapogenin acetate is prepared according to the method of Marker and Rohrmann, J. Am. Chem. Soc., 61, 846 (1939).

(b) To a solution of 500 mg. of bromosarsasapogenin acetate in 100 cc. of methanol is added 30 g. of amalgamated zinc. The mixture is brought to a boil and 40 cc. of concentrated hydrochloric acid is added over a period of three hours. Then the mixture is diluted with water, extracted with ether, and the ethereal layer washed with water. The ether is removed on the steam bath and the residue is crystallized from ethyl acetate to give tetrahydrosarsasapogenin of melting point 191° C.

Similar results are obtained when chlorosarsasapogenin acetate (prepared by chlorinating the side chain of sarsasapogenin acetate) is substituted for bromosarsasapogenin acetate in this example.

The above examples illustrative of this invention are subject to numerous variations which, in view of this disclosure, will be apparent to those skilled in the art. While this invention is limited in its application to steroidal sapogenins having the regular or coprostane configuration with regard to $C_5$ within this group numerous types of compounds may be employed. For example, the side chain of the steroidal sapogenin may be of either the sarsasapogenin or of the tigogenin type. Furthermore, the side chain halogenated sapogenins having either the sarsasapogenin or tigogenin type of side chain may be employed in the practice of this invention with results as satisfactory as those obtained with the parent unhalogenated sapogenins. Rings A and/or B may bear substituents selected from the class consisting of ketonic groups and groups hydrolyzable to ketonic groups, and hydroxyl groups and groups hydrolyzable to hydroxyl groups. Certain transformations of substituents which may be attached to rings A and/or B may occur simultaneously with the reduction of the sapogenin side chain. For example, nuclear ketone groups at $C_3$ and $C_6$ are reduced in the course of the reduction to give methylene groups. Again, ester groups such as an acetoxy group at C₃ may be saponified to hydroxyl groups during the reduction of the sapogenin side chain. Nuclear halogen groups such as a chlorine atom at C₃ are usually unaffected during the reduction.

Other modes of isolating and purifying the tetrahydrosapogenins of this invention may be used instead of extraction with ether and crystallization as indicated in the examples. The method selected for isolation and purification of a particular tetrahydrosapogenin will be determined by its properties, but in general the methods will employ customary procedures in this art, such as partition between immiscible solvents, high vacuum distillation, chromatographic adsorption and like devices.

Accordingly, I do not wish my invention to be limited to any specific embodiment but rather desire that it be interpreted as broadly as possible in view of the prior art and the appended claims.

What I claim as my invention is:

1. Process for the preparation of steroidal sapogenin derivatives which comprises treating a compound of the class consisting of steroidal sapogenins having the coprostane configuration at C₅, the nuclear transformation products thereof and side chain halogenated derivatives thereof, while in an organic solvent with a mineral acid and zinc, under conditions more vigorous than those required merely to reduce a nuclear 3-keto group, thereby forming tetrahydrosapogenin compounds.

2. Process according to claim 1 in which the mineral acid is a member of the class consisting of hydrochloric acid and hydrobromic acid.

3. Process according to claim 1 wherein the organic solvent is a lower aliphatic alcohol.

4. Process according to claim 1 wherein the zinc has previously been amalgamated.

5. Process for the preparation of steroidal sapogenin derivatives which comprises treating a compound of the class consisting of steroidal sapogenins having the coprostane configuration at C₅, the nuclear transformation products thereof, and side chain halogenated derivatives thereof, while in a lower aliphatic alcohol solvent with hydrochloric acid and amalgamated zinc, under conditions more vigorous than those required merely to reduce a nuclear 3-keto group to form tetrahydrosapogenin compounds.

6. Process according to claim 1 wherein the tetrahydrosapogenin compound is separated from the solution and isolated.

7. Process which comprises treating a tetrahydrosapogenin compound with a member of the class consisting of acylating agents, etherifying agents and halogenating agents, thereby obtaining a sapogenin derivative having in the side chain thereof a group of the class consisting of -O-acyl, -O-aralkyl, and halogen.

8. Process according to claim 5 wherein the sapogenin treated is one of the class consisting of sarsasapogenin and its esters.

9. A steroidal sapogenin derivative of the group consisting of tetrahydrosarsasapogenin and its esters with carboxylic acids, said compounds being further characterized by the inertness of its side chain to the action of bromine in acetic acid and to the action of the selenium dioxide in acetic acid.

10. Tetrahydrosarsasapogenin.

11. Tetrahydrosarsasapogenin diacetate.

12. Tetrahydrosarsasapogenin dibenzoate.

13. Process for the preparation of steroidal sapogenin derivatives which comprises treating a compound having the following formula

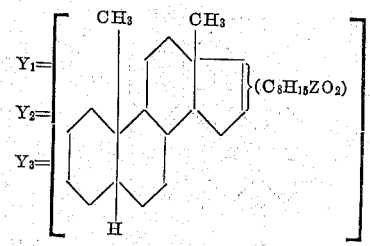

where $Y_1$, $Y_2$ and $Y_3$ are substituents attached to methylene carbon atoms in the A—B portion of the steroid skeleton, said substituents $Y_1$, $Y_2$ and $Y_3$ being a member of the class consisting of

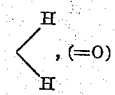

groups hydrolyzable to (=O),

and groups hydrolyzable to

and Z is a member of the class consisting of hydrogen and halogen, while in an organic solvent with a mineral acid and zinc, under conditions more vigorous than those required merely to reduce a nuclear 3-keto group thereby forming a tetrahydrosapogenin compound.

14. A tetrahydrosapogenin derivative having the formula,

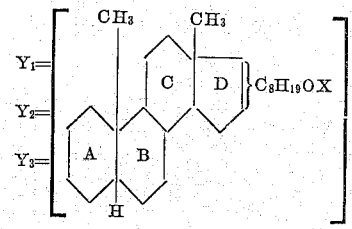

where $Y_1$, $Y_2$ and $Y_3$ are substituents attached to methylene carbon atoms in the A—B portion of the steroid skeleton, said substituents $Y_1$, $Y_2$ and $Y_3$ being members of the class consisting of

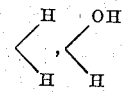

and groups convertible to

X is a member of the class consisting of —OH and groups hydrolyzable to —OH, and the group $C_8H_{19}OX$ is a tetrahydrosapogenin side chain attached to ring D of the formula and obtainable by tetrahydrogenation by means of amalgamated zinc and hydrochloric acid of a ring D side chain identical with that found in a naturally occurring sapogenin, said tetrahydrogenated side chain being further characterized by its inertness to the action of bromine in acetic acid and to the action of selenium dioxide in acetic acid.

15. A tetrahydrosapogenin derivative having the formula,

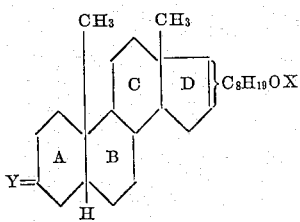

where Y is a member of the class consisting of

and groups hydrolyzable to

X is a member of the class consisting of —OH and groups hydrolyzable to —OH, and the group $C_8H_{17}OX$ is a tetrahydrosapogenin side chain attached to ring D of the formula and obtainable by tetrahydrogenation by means of amalgamated zinc and hydrochloric acid of a ring D side chain identical with that found in a naturally occurring sapogenin, said tetrahydrogenated side chain being further characterized by its inertness to the action of bromine in acetic acid and to the action of selenium dioxide in acetic acid.

RUSSELL EARL MARKER.